(12) United States Patent
Sharma et al.

(10) Patent No.: US 9,090,503 B2
(45) Date of Patent: Jul. 28, 2015

(54) COATINGS FOR ENHANCING GLASS STRENGTH

(71) Applicant: Owens-Brockway Glass Container Inc., Perrysburg, OH (US)

(72) Inventors: Pramod K. Sharma, Ann Arbor, MI (US); Scott Cooper, Perrysburg, OH (US); Michael P. Remington, Jr., Toledo, OH (US); Carol A. Click, Corning, NY (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 231 days.

(21) Appl. No.: 13/729,109

(22) Filed: Dec. 28, 2012

(65) Prior Publication Data
US 2014/0182337 A1    Jul. 3, 2014

(51) Int. Cl.
| C03C 17/30 | (2006.01) |
| C03C 17/00 | (2006.01) |
| C03C 17/34 | (2006.01) |
| C03C 17/25 | (2006.01) |

(52) U.S. Cl.
CPC ............. *C03C 17/30* (2013.01); *C03C 17/005* (2013.01); *C03C 17/25* (2013.01); *C03C 17/3417* (2013.01); *C03C 2217/213* (2013.01); *C03C 2218/113* (2013.01)

(58) Field of Classification Search
None
See application file for complete search history.

(56) References Cited

U.S. PATENT DOCUMENTS

| 2,832,754 A | 4/1958 | Kenmore et al. |
| 2,971,864 A | 2/1961 | Speier |
| 3,108,920 A | 10/1963 | Lagally |
| 3,258,444 A | 6/1966 | Santelli |
| 3,433,764 A | 3/1969 | Walmsley |
| 3,438,801 A | 4/1969 | Schlientz et al. |
| 3,522,075 A | 7/1970 | Kiel |
| 3,560,543 A | 2/1971 | Plueddemann |
| 3,801,361 A | 4/1974 | Kitaj |
| 3,873,352 A | 3/1975 | Kitaj |
| 3,959,533 A | 5/1976 | Kitaj |
| 3,998,985 A | 12/1976 | Kitaj |
| 4,130,677 A | 12/1978 | Huntsberger |
| 4,179,537 A | 12/1979 | Rykowski |
| 4,420,578 A * | 12/1983 | Hagens et al. ............... 524/322 |
| 4,898,786 A | 2/1990 | Swofford |
| 4,977,029 A | 12/1990 | Brown et al. |
| 4,985,286 A | 1/1991 | Kurita et al. |
| 5,322,873 A | 6/1994 | Pohl et al. |

(Continued)

FOREIGN PATENT DOCUMENTS

| GB | 1478484 | 6/1977 |
| WO | 0164804 | 9/2001 |

(Continued)

OTHER PUBLICATIONS

Asgar et al., "Photodefinable polydimethylsiloxane (PDMS) for rapid lab-on-a-chip prototyping", Royal Society of Chemistry, pp. 1192-1197, 2007.*

(Continued)

*Primary Examiner* — Lisa Herring

(57) ABSTRACT

Methods of manufacturing and coating a glass container by applying an aminofunctional silane coating composition to an exterior surface of the glass container, and then curing the silane coating composition to form a crosslinked siloxane coating on the exterior surface of the glass container.

24 Claims, 2 Drawing Sheets

(56) References Cited

U.S. PATENT DOCUMENTS

| | | |
|---|---|---|
| 5,354,829 A | 10/1994 | Swisher et al. |
| 5,426,142 A | 6/1995 | Rosano et al. |
| 5,567,235 A | 10/1996 | Carson et al. |
| 5,569,537 A | 10/1996 | Miyasaka et al. |
| 5,910,360 A | 6/1999 | Boumera et al. |
| 6,013,333 A | 1/2000 | Carson et al. |
| 6,060,559 A | 5/2000 | Feng et al. |
| 6,096,394 A | 8/2000 | Jenkner et al. |
| 6,120,908 A | 9/2000 | Papanu et al. |
| 6,363,749 B1 * | 4/2002 | Jenkner et al. ............ 65/60.3 |
| 6,403,175 B1 | 6/2002 | Speier et al. |
| 6,432,191 B2 | 8/2002 | Schutt |
| 6,534,187 B2 | 3/2003 | Kron et al. |
| 7,834,073 B2 | 11/2010 | Standke et al. |
| 7,919,175 B2 | 4/2011 | Bennison et al. |
| 8,168,738 B2 | 5/2012 | Ambrose et al. |
| 2007/0299177 A1 | 12/2007 | Serobian |
| 2008/0318063 A1 | 12/2008 | Anderson |
| 2009/0155576 A1 | 6/2009 | Anderson |
| 2010/0080983 A1 * | 4/2010 | Anderson ............... 428/334 |
| 2011/0003098 A1 | 1/2011 | Wen et al. |

FOREIGN PATENT DOCUMENTS

| | | |
|---|---|---|
| WO | 2007026121 | 3/2007 |
| WO | 2008104825 | 9/2008 |
| WO | 2012166221 | 12/2012 |

OTHER PUBLICATIONS

PCT Search Report and Written Opinion, Int. Serial No. PCT/US2013/071963, Inc. Filing Date: Nov. 26, 2013, Applicant: Owens-Brockway Glass Container Inc., Mail Date: Aug. 11, 2014.

* cited by examiner

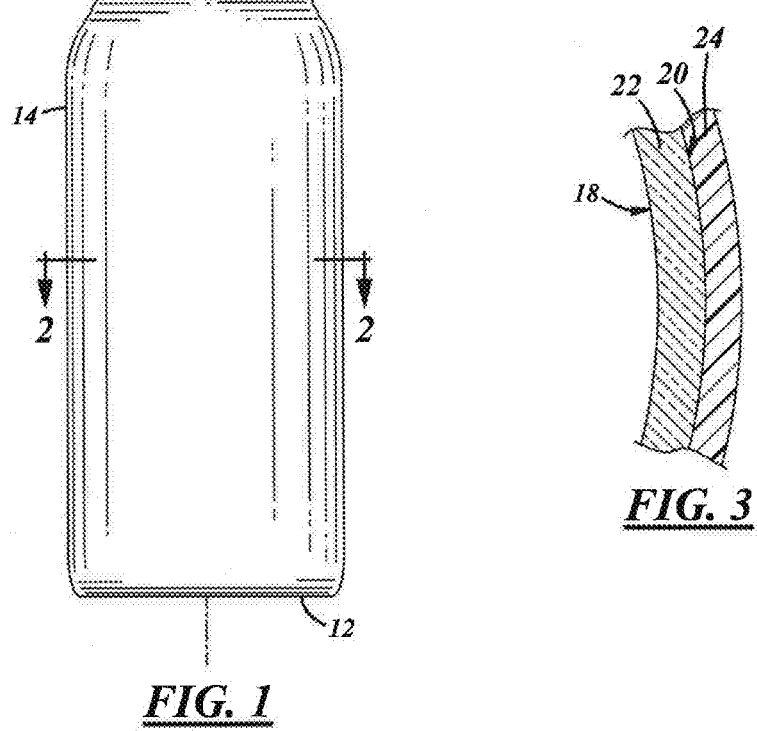
FIG. 1
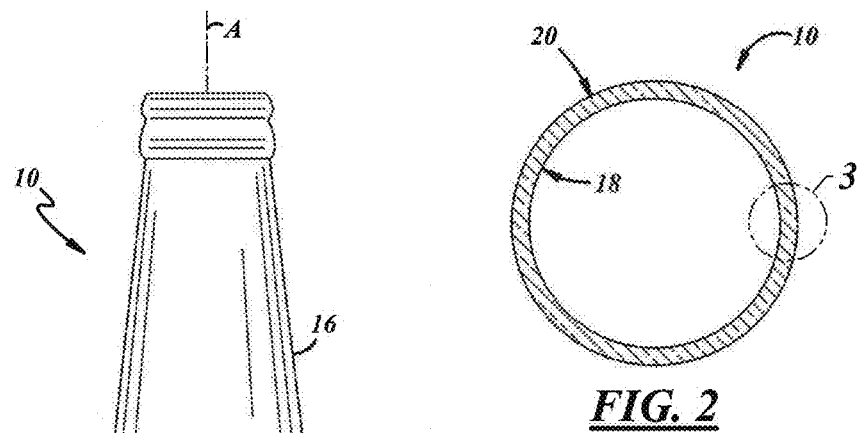
FIG. 2
FIG. 3

COATINGS FOR ENHANCING GLASS STRENGTH

The present disclosure is directed to coating processes, including methods and materials for coating glass containers to enhance glass container strength.

BACKGROUND AND SUMMARY OF THE DISCLOSURE

Glass containers may be coated with one or more coating compositions during manufacture to impart scratch resistance, lubricity, and/or decoration to the glass containers. For example, U.S. Pat. No. 3,522,075 discloses a process for coating a glass container with an organopolysiloxane coating. The glass container is first coated or primed with a metal oxide layer after it leaves a glass-forming machine, but before it is passed through an annealing lehr. Upon exiting the annealing lehr, an organopolysiloxane resin-based coating composition is applied to the glass container over the metal oxide layer to form the organopolysiloxane coating.

A general object, in accordance with one aspect of the present disclosure, is to provide a process for strengthening a glass container by applying an aminofunctional silane coating composition to an exterior surface of the glass container, and then curing the coating composition to form a siloxane coating on the exterior surface of the glass container. The siloxane coating can fill-in or "heal" any commercial variations or anomalies on the exterior surface of the glass container, which can improve the mechanical strength of the glass container.

The present disclosure embodies a number of aspects that can be implemented separately from or in combination with each other.

In accordance with one aspect of the disclosure, there is provided a method of forming a siloxane coating on a glass container by applying a silane coating composition to an exterior surface of the glass container, and then curing the silane coating composition to form the siloxane coating on the exterior surface of the glass container. The silane coating composition is preferably an aqueous solution that includes, and most preferably consists essentially of, an aminofunctional silane and water.

In accordance with another aspect of the disclosure, there is provided a method of forming a siloxane coating on a glass container by: (a) applying a first silane coating composition to a surface of the glass container; (b) curing the first silane coating composition to form a first siloxane layer on the surface of the glass container; (c) applying a second silane coating composition to the surface of the glass container over the first siloxane layer; and then (d) curing the second silane coating composition to form a second siloxane layer over the first siloxane layer on the surface of the glass container. The first silane coating composition of step (a) preferably includes, and most preferably consists essentially of, an aminofunctional silane and water.

In accordance with yet another aspect of the disclosure, there is provided a method of manufacturing a soda-lime-silica glass container by: (a) forming the glass container, (b) forming a hot-end coating on an exterior surface of the glass container; (c) annealing the glass container; (d) forming a siloxane coating on the glass container over the hot-end coating; and then (e) forming a cold-end coating on the glass container over the siloxane coating. The siloxane coating is formed on the glass container by applying a silane coating composition to the glass container over the hot-end coating and then curing the silane coating composition. The silane coating composition is preferably an aqueous solution that includes, and most preferably consists essentially of, an aminofunctional silane and water.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is a side elevation of a glass container in accordance with an exemplary embodiment of the present disclosure;

FIG. 2 is a cross-sectional view of the glass container of FIG. 1, taken along line 2 of FIG. 1;

FIG. 3 is an enlarged cross-sectional view of a portion of the glass container, taken from circle 3 of FIG. 2;

DETAILED DESCRIPTION OF PREFERRED EMBODIMENTS

Figure 4:
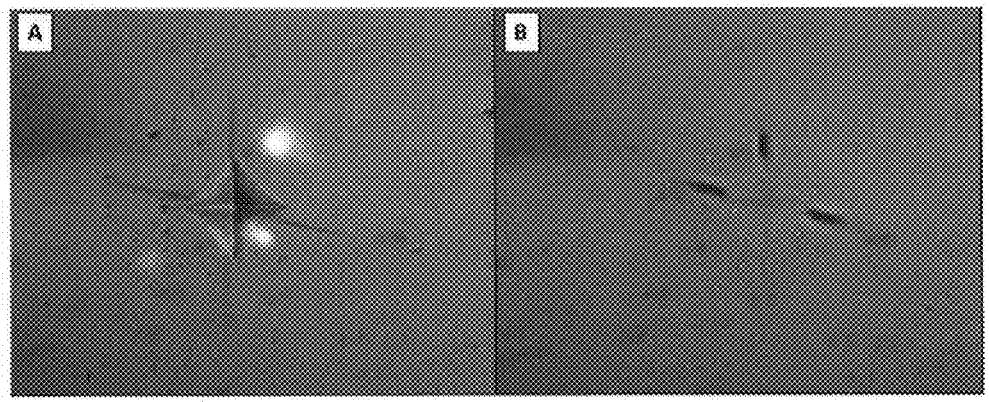
FIG. 4 illustrates microscope images of Vickers hardness indentations in an uncoated glass substrate (A) and a glass substrate coated by an exemplary embodiment of the presently disclosed coating process (B)

FIG. 1 illustrates an exemplary embodiment of a glass container 10 that may be produced in accordance with an exemplary embodiment of a manufacturing process presently disclosed hereinbelow. The glass container 10 includes a base wall 12, a continuous sidewall 14 integrally formed with the base wall 12, and a neck 16 extending from the sidewall 14. As shown in FIG. 2, the glass container 10 is hollow and has an interior surface 18 and an exterior surface 20.

The glass container 10 is preferably made of an inorganic silica-based glass, such as soda-lime-silica glass. A presently preferred soda-lime-silica glass composition may comprise: about 60-75 wt % $SiO_2$, about 7-15 wt % $Na_2O$, about 6-12 wt % CaO, about 0.1-3 wt % $Al_2O_3$, about 0.1-2 wt % MgO, and about 0.1-2 wt % $K_2O$. The soda-lime-silica glass composition also may include other materials in relatively small amounts. For example, the glass composition may include about 0-1.0 wt % iron oxide ($Fe_2O_3$), 0-0.5 wt % titanium oxide ($TiO_2$), and about 0-0.5 wt % sulfur trioxide ($SO_3$).

FIG. 3 is an enlarged cross-sectional view of a portion of the glass container 10, and illustrates that the glass container 10 includes a glass substrate 22 having a crosslinked siloxane coating 24 formed on its exterior surface 20. The siloxane coating 24 is produced by applying a silane coating composition to the exterior surface of the glass container, and then curing the coating composition. The siloxane coating 24 has the potential to increase the strength of the glass container by filling-in and/or "healing" surface anomalies that may be present on the exterior surface of the glass container, and by preventing further creation of surface variations. The siloxane coating 24 illustrated in FIG. 3 is formed directly on the glass substrate 22, and is the only coating layer formed on the glass substrate 22. However, in other embodiments, the siloxane coating 24 may be formed on the glass substrate 22 over one or more preexisting coatings. For example, a metal oxide coating, e.g., a tin oxide ($SnO_2$) coating or a titanium dioxide ($TiO_2$) coating, may be formed directly on the glass substrate 22, and the siloxane coating 24 may be formed on the glass substrate overlying the metal oxide coating. Formation of a metal oxide coating on the glass substrate 22 prior to formation of the siloxane coating 24 may help protect the exterior surface of the glass container 10 from damage during handling, and also may help prepare or prime the surface for the subsequent formation of the siloxane coating 24. In addition, one or more coatings may be formed on the glass substrate 22 after formation of the siloxane coating 24. For example, an organic coating, e.g., a polyethylene coating, may be formed on the glass substrate 22 over the siloxane coating 24. A suitable thickness for the glass substrate 22 (measured from the interior surface 18 to the exterior surface 20, or vice versa) is in the range of 1 mm to 5 mm. A suitable thickness for the siloxane coating 24 is in the range of 100 nm to 300 nm.

The glass container 10 may be produced by any suitable method. For example, the glass container may be produced in a continuously operated glass manufacturing facility, which typically includes a glass furnace having an upstream end where raw materials are introduced, and a downstream end from which molten glass is distributed. Exemplary conditions and procedures for composing and melting production container glass can be found in, for example, *The Handbook of Glass Manufacture* by Fay V. Tooley (3rd ed., Ashlee Publishing 1984).

In a conventional container glass manufacturing facility, molten glass is channeled from the glass furnace through one or more forehearths to a plurality of forming machines, which shear off weighed "gobs" of molten glass. The glass gobs are loaded into forming machines, known as individual sections, where they are molded into glass containers as per the desired container design. Thereafter, the glass containers are passed through an annealing lehr where they are reheated and slowly cooled according to a predetermined temperature profile to remove stress points and to prevent the glass containers from becoming brittle. At an entry, hot end, or upstream portion of the annealing lehr, the temperature therein may be between 750 degrees Celsius and 550 degrees Celsius. Through the lehr, the temperature may be brought down gradually to a downstream portion, cool end, or exit of the lehr, for example, to a temperature therein of between 130 degrees Celsius and 65 degrees Celsius. The cooled glass containers may then be inspected, for example, for surface irregularities or any other undesirable commercial variations or anomalies. After inspection, the glass containers may be labeled and packaged. The upstream portions of a container glass manufacturing process (e.g., the glass melting, forming, and annealing processes) are typically referred to as "hot-end" processes, while the downstream portions (e.g., the glass container inspection, labeling, and packaging processes) are typically referred to as "cold-end" processes.

One or more coatings may be applied to the exterior surface of the glass container 10 after the container is formed, but before it is passed through an annealing lehr. Such coatings are typically referred to as "hot-end coatings." For example, a hot-end coating of a metal oxide may be formed on the external surface of the glass container by applying a metal compound to the surface of the glass container while it is still hot (e.g., while it is at a temperature in the range of about 450 degrees Celsius to 600 degrees Celsius).

As discussed above, the siloxane coating 24 is formed on the exterior surface of the glass container 10 by applying a silane coating composition to the exterior surface of the glass container, and curing the coating composition. The silane coating composition of the present disclosure is an aqueous aminofunctional silane coating composition, and includes at least one aminofunctional silane and water as a solvent. The aminofunctional silane coating composition may be prepared by adding an aminofunctional silane to water with stirring for at least 5 minutes (or until the solution becomes transparent), or by purchasing an aqueous solution containing an aminofunctional silane and using it as the aminofunctional silane coating composition. In other embodiments, an aqueous solution containing an aminofunctional silane may be purchased, and then diluted with water to yield an aqueous solution having a desired concentration of aminofunctional silanes. One example of a suitable commercially available aqueous aminofunctional silane-containing solution is Z-6137 sold by Dow Corning Corporation, which includes about 22 wt. % of an aminofunctional silane homopolymer.

The aminofunctional silane coating composition may have a silane concentration in the range of 0.1-35 wt. %, and the concentration may depend upon the desired thickness of the siloxane coating 24. In one embodiment, the silane coating composition may have a silane concentration of about 2 wt. %. For example, the silane coating compositions may comprise 0.5-3.0 wt. % silanes. The aminofunctional silane coating composition also may include colloidal silica in amounts ranging from about 1-20 wt. % of the overall coating composition. In one embodiment, the aminofunctional silane coating composition may include less than 5 wt % colloidal silica.

Suitable aminofunctional silanes for use in the silane coating composition of the present disclosure include those having the following general formula: $Si(R)_x(R')_y(R'')_z$, where R is an aminofunctional group, R' is a non-hydrolyzable group, R" is a hydrolyzable group, x is one, y is an integer from zero to two, and z is an integer from one to three. Examples of suitable aminofunctional groups include: aminoethyl, aminopropyl, aminobutyl, aminoethylaminopropyl, and aminoethylaminoisobutyl. Examples of suitable non-hydrolyzable groups include alkyl groups, e.g., methyl and/or ethyl groups. Examples of suitable hydrolyzable groups include alkoxy groups, e.g., methoxy and/or ethoxy groups. Some representative examples of suitable aminofunctional silanes for use in the silane coating composition of the present disclosure include: N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminoisobutylmethyldimethoxysilane (Aminoethylamino)-3-isobutyldimethylmethoxysilane, (3-trimethoxysilylpropyl)diethylenetriamine, 3-aminopropyltrimethoxysilane, 3-aminopropyltriethoxysilane, 3-aminopropylmethyldiethoxysilane, and 3-aminopropyldimethylethoxysilane.

The aminofunctional silane coating composition is preferably prepared using water as a solvent as the presently disclosed aminofunctional silanes are highly soluble and particularly stable in water. Accordingly, the aminofunctional silane coating composition of the present disclosure may be prepared without the addition of a non-ionic surfactant and thus may be in the form of a solution, rather than an emulsion. When silanes are added to water, any hydrolyzable groups attached thereto are hydrolyzed, thereby forming reactive silanol groups. Some of these silanol groups may condense with other silanol groups in solution to form siloxanes. Therefore, the aminofunctional silane coating composition of the present disclosure may include a mixture of silanes, silanols, and/or siloxanes at any given time.

The aminofunctional silane coating composition is preferably prepared without addition of any organic solvents, i.e., without addition of any volatile organic compounds (VOCs). The coating composition, however, may contain small amounts of methanol and/or ethanol, which may be produced as a byproduct of hydrolysis reactions occurring within the aqueous solution. For example, the aminofunctional silane coating composition preferably contains less than 2 wt. %

VOCs. The silane coating composition is also preferably prepared without the addition of any polymers, copolymers, or polymerizable compounds that do not contain at least one silicon-oxygen bond (—Si—O—) or at least one silicon atom supporting one or more functional groups. A few polymerizable compounds that do not contain silicon and thus are preferably excluded from the silane coating composition include monomers, polymers, and copolymers having carboxyl or hydroxyl functional groups (e.g., glycols such as ethylene glycol), alkene functional groups (e.g., polyolefins such as polyethylene and polypropylene), acryl functional groups (e.g., acrylates and methacrylates), epoxide functional groups (e.g., epoxy resins), or amine functional groups.

The aminofunctional silane coating composition may be applied to the glass container 10 at any suitable location in a container glass manufacturing process. However, the silane coating composition is preferably applied to the glass container while the container is at a temperature below 150 degrees Celsius to help ensure uniform coating of the coating composition on the glass container. For example, the silane coating composition may suitably be applied to the glass container while the container is at a temperature between 25 degrees Celsius and 150 degrees Celsius. Any suitable technique may be used to apply the silane coating composition to the glass container, including spraying, brushing, dip coating, spin coating, and curtain coating. In one embodiment, the silane coating composition is applied to the glass container immediately after it leaves the annealing lehr. After the glass container exits the annealing lehr, it may have a temperature between 130 degrees Celsius and 65 degrees Celsius, which may be sufficient to cure the silane coating composition without additional heat treatment. In another embodiment, the silane coating composition may be applied to the glass container at a lower temperature, which may be insufficient to cure the coating composition. In this embodiment, the glass container may be heated to a temperature of about 200 degrees Celsius for 15 minutes to cure the silane coating composition. For example, the glass container may be heated to a temperature in the range of 150 degrees Celsius to 250 degrees Celsius for about 10 to 20 minutes to cure the silane coating composition and form a crosslinked siloxane coating on the exterior surface of the glass container.

After the aminofunctional silane coating composition is cured at a temperature below 300 degrees Celsius, it will include aminofunctional groups. Accordingly, after the aminofunctional silane coating composition is cured it may be referred to as an aminofunctional siloxane coating. To remove the aminofunctional groups, the glass container and the aminofunctional siloxane coating may be heated to a temperature of about 600 degrees Celsius for about 5 minutes. For example, the glass container and the siloxane layer may be heated to a temperature in the range of 500 degrees Celsius to 700 degrees Celsius for 1 to 10 minutes to decompose the aminofunctional groups attached to the siloxane coating, and form a siloxane coating that is free of aminofunctional groups. Thereafter, the temperature of the glass container may be brought down gradually, for example, by passing the glass container through an annealing lehr.

In one embodiment, the siloxane coating 24 is a "monolayer" coating and is formed by applying or depositing a single layer of the aminofunctional silane coating composition to the exterior surface of the glass container, and then curing the entire coating composition at substantially the same time. In this embodiment, the siloxane coating 24 may be considered "monolithic," and may have a generally consistent composition across its thickness.

In another embodiment, the siloxane coating 24 is a "multilayer" coating and is formed by applying two or more layers of the same or a different silane coating composition to the glass container, and then curing each of the layers separately from one another and in succession. For example, the siloxane coating 24 may be formed by applying a single layer of an aminofunctional silane coating composition to the exterior surface of the glass container, curing the aminofunctional silane coating composition to form an aminofunctional siloxane layer, cooling the glass container to a temperature below 150 degrees Celsius, applying a single layer of an organofunctional silane coating composition to the exterior surface of the glass container over the aminofunctional siloxane layer, and then curing the organofunctional silane coating composition to form an organofunctional siloxane layer over the aminofunctional siloxane layer. The organofunctional silane coating composition may be applied to the glass container and cured on the exterior surface of the glass container using the same or similar methods as those described above with respect to the aminofunctional silane coating composition. In this embodiment, the siloxane coating 24 includes two layers, an aminofunctional siloxane layer and an organofunctional siloxane layer. After formation, this multilayer siloxane coating may be further heated to a temperature in the range of 500 degrees Celsius to 700 degrees Celsius for 1 to 10 minutes to decompose any organofunctional groups (including aminofunctional groups) attached to the aminofunctional siloxane layer and the organofunctional siloxane layer of the siloxane coating, and thereby form a multilayer siloxane coating that is free of organofunctional groups.

Examples of suitable organofunctional silanes that may be used to form one or more separate siloxane layers over the aminofunctional siloxane layer include amino-functional silanes (such as the aminofunctional silanes listed above), as well as epoxy-functional silanes, acrylate-functional silanes, methacrylate-functional silanes, carboxylate-functional silanes, phosphonate-functional silanes, sulfonate-functional silanes, isocyanate-functional silanes, mercapto-functional silanes, allyl-functional silanes, and/or vinyl-functional silanes. Some representative examples of suitable organofunctional silanes include: (3-acryloxypropyl)trimethoxysilane, 3-methacryloxypropyltrimethoxysilane, carboxyethylsilanetriol, 3-(trihydroxysilyl)-1-propanesulfonic acid, (3-glycidoxypropyl)trimethoxysilane, (3-glycidoxypropyl) triethoxysilane, 3-isocyanatopropyltriethoxysilane, 3-isocyanatopropylmethoxysilane, 3-mercaptopropyltrimethoxysilane, 3-mercaptopropyltriethoxysilane, allyltrimethoxysilane, vinyltriethoxysilane, and vinyltrimethoxysilane.

One or more additional coatings may be formed on the glass container over the siloxane coating 24. These additional coatings are suitably formed on the glass container 10 after it leaves the annealing lehr. Accordingly, these coatings may be referred to as a "cold-end coatings." In one embodiment, a polyethylene coating may be formed on the glass container over the siloxane coating 24 by applying an aqueous polyethylene emulsion to the glass container while it is at a suitable temperature.

After the siloxane coating 24 and any other desired coatings have been formed on the glass container, the container may be inspected. For example, the glass container may be manually or automatically inspected for surface irregularities, coating properties, and/or the like. After inspection, the glass container may be labeled and/or packaged in any suitable manner.

The presently disclosed manufacturing process may or may not include all of the disclosed steps, which may or not be performed according to the sequence set forth above. That is, the presently disclosed manufacturing and coating process may encompass any sequencing, overlap, or parallel processing of such steps.

The present disclosure may provide one or more advancements in the art. For example, the presently disclosed siloxane coating may be used to improve the strength of a glass container by better healing of glass container surface anomalies. In addition, the presently disclosed aminofunctional silanes were selected for use because they have been found to be particularly stable in water over time. Therefore, the presently disclosed aminofunctional silane coating compositions may be prepared and used to form more consistent siloxane coatings on glass containers over a period of several days or weeks.

EXAMPLE

Several 2"×2" soda-lime-silica glass substrates having thicknesses of 3.2 mm were washed with soap and water, wiped with isopropyl alcohol, and then dried. Thereafter, an indentation was formed in each of the glass substrates using a Vickers harness instrument at 200 gf for 30 seconds. Some of these glass substrates were then coated using exemplary silane coating compositions, and some were not.

Coating of the glass substrates in this Example was performed by the following process. An exemplary silane coating composition, according to one embodiment of the present disclosure, was prepared comprising 1.3 wt. % N-(2-aminoethyl)-3-aminopropyl trimethoxysilane and 98.7 wt. % water. The coating composition was then applied to the glass substrates using a spin coater for 18 seconds with 500 rpm as a ramping speed. Thereafter, the coated glass substrates were heated on a hot plate having a temperature of 200° C. for 20 minutes to cure the coating composition. FIG. 4 illustrates microscope images of Vickers hardness indentations in an uncoated glass substrate (A) and a glass substrate coated by the above process (B). As shown, the presently disclosed coating process can be used to improve the visual appearance of a glass substrate by filling-in or healing surface flaws thereon.

Figure 5:
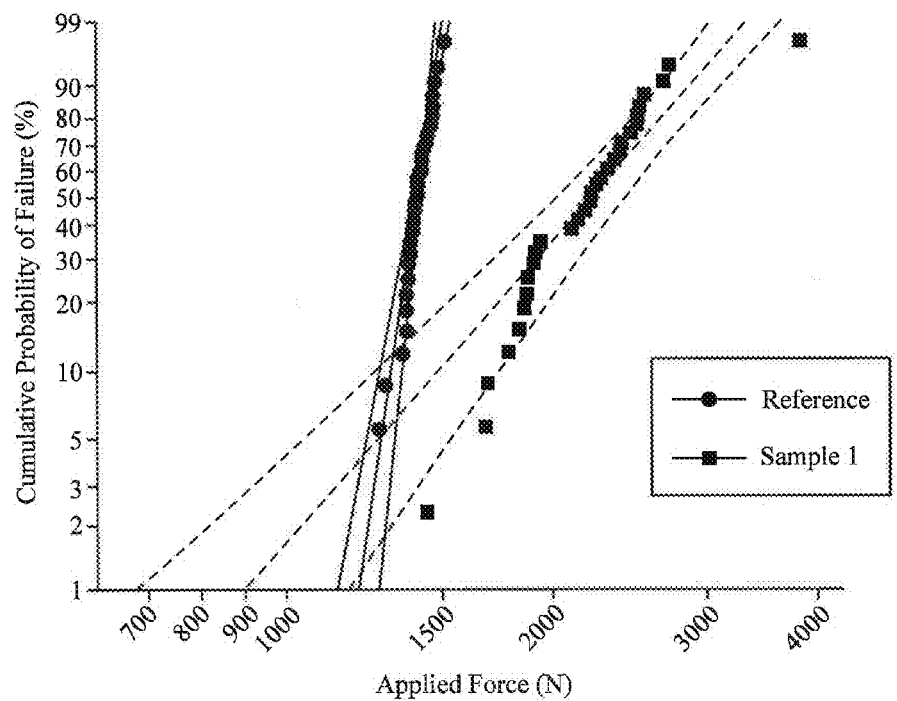
FIG. 5 illustrates Weibull plots of cumulative probability of failure (%) vs. applied force (N) for an uncoated glass substrate (labeled as "Reference") and a glass substrate coated by an exemplary embodiment of the presently disclosed coating process (labeled as "Sample 1").

The strength of each glass substrate was assessed by performing ring-on-ring tests using an electromechanical Universal Testing Machine AGS-X-5kN by Shimadzu. Weibull plots of cumulative failure probability (%) vs. applied force (N) for an uncoated glass substrate and a glass substrate coated by the above process are illustrated in FIG. 5. The results for the uncoated glass substrate are shown using circle-shaped data markers and the results for the coated glass substrate are shown using square-shaped data markers. As shown in FIG. 5, the presently disclosed coating process can be used to increase the force required to break a glass substrate.

There thus has been disclosed a surface treatment process for a glass container that at least partially satisfies one or more of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of forming a siloxane coating on a glass container including the steps of:
   (a) applying a silane coating composition to an exterior surface of the glass container, wherein the silane coating composition is an aqueous solution consisting essentially of an aminofunctional silane and water;
   (b) curing the silane coating composition to form the siloxane coating on the exterior surface of the glass container; and then
   (c) heating the glass container and the siloxane coating to a temperature in the range of 500 degrees Celsius to 700 degrees Celsius to decompose organofunctional groups attached to the siloxane coating.

2. The method set forth in claim 1 wherein step (a) includes applying a silane coating composition having an aminofunctional silane concentration of 0.1-35 wt. % to the exterior surface of the glass container.

3. The method set forth in claim 1 wherein step (a) includes applying the silane coating composition to the exterior surface of the glass container while the glass container is at a temperature in the range of 25 degrees Celsius to 150 degrees Celsius.

4. The method set forth in claim 1 wherein step (b) includes heating the glass container and the silane coating composition to a temperature in the range of 150 degrees Celsius to 250 degrees Celsius for 10 to 20 minutes.

5. The method set forth in claim 1 wherein step (a) includes applying the silane coating composition to the exterior surface of the glass container while the glass container is at a temperature in the range of 65 degrees Celsius to 130 degrees Celsius, and step (b) does not require further heating of the glass container or the silane coating composition.

6. The method set forth in claim 1 wherein the glass container and the siloxane coating are heated in step (c) for 1 to 10 minutes.

7. The method set forth in claim 1 wherein the aminofunctional silane constitutes 0.5-3.0 wt. % of the silane coating composition, with the balance consisting essentially of water.

8. The method set forth in claim 7 wherein the silane coating composition is prepared without addition of an organic solvent.

9. The method set forth in claim 7 wherein the silane coating composition is prepared without addition of a non-ionic surfactant.

10. The method set forth in claim 7 wherein the silane coating composition is prepared without addition of any polymers, copolymers, or polymerizable compounds that do not contain at least one silicon-oxygen bond.

11. The method set forth in claim 1 wherein the silane coating composition includes 1-20 wt. % colloidal silica.

12. The method set forth in claim 1 wherein the silane coating composition of step (a) includes an aminofunctional silane having an aminofunctional group selected from the group consisting of: aminoethyl, aminopropyl, aminobutyl, aminoethylaminopropyl, and aminoethylaminoisobutyl.

13. The method set forth in claim 1 wherein the silane coating composition of step (a) includes an aminofunctional silane selected from the group consisting of: N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminoisobutylmethyldimethoxysilane, (Aminoethylamino)-3-isobutyldimethylmethoxysilane, (3-trimethoxysilylpropyl)diethylenetriamine, 3-aminopropyltrimethoxysilane, 3-aminopropyltriethoxysilane, 3-aminopropylmethyldiethoxysilane, and 3-aminopropyldimethylethoxysilane.

14. A method of forming a multilayer siloxane coating on a glass container including the steps of:
   (a) applying a first silane coating composition to a surface of the glass container, wherein the first silane coating composition consists essentially of an aminofunctional silane and water;
   (b) curing the first silane coating composition to form a first siloxane layer on the surface of the glass container;
   (c) applying a second silane coating composition to the surface of the glass container over the first siloxane layer; and then
   (d) curing the second silane coating composition to form a second siloxane coating over the first siloxane layer on the surface of the glass container; and then
   (e) heating the glass container and the first and second siloxane coatings to a temperature in the range of 500 degrees Celsius to 700 degrees Celsius to decompose organofunctional groups attached to the siloxane coating.

15. The method set forth in claim 14 further comprising, between steps (b) and (c), cooling the glass container to a temperature below 150 degrees Celsius.

16. The method set forth in claim 14, wherein the siloxane coating formed in step (b) has aminofunctional groups attached thereto.

17. The method set forth in claim 14, wherein the second siloxane coating formed in step (d) has organofunctional groups attached thereto.

18. The method set forth in claim 14 wherein the second silane coating composition of step (c) includes an organofunctional silane selected from the group consisting of: an amino-functional silane, an epoxy-functional silane, an acrylate-functional silane, a methacrylate-functional silane, a carboxylate-functional silane, a phosphonate-functional silane, a sulfonate-functional silane, an isocyanate-functional silane, a mercapto-functional silane, an allyl-functional silane, and a vinyl-functional silane.

19. The method set forth in claim 14, wherein steps (c) and (d) are performed after step (b), but prior to performing step (e).

20. the method set forth in claim 14, wherein the first silane coating composition of step (a) includes an aminofunctional silane having an aminofunctional group selected from the group consisting of: aminoethyl, aminopropyl, aminobutyl, aminoethylaminopropyl, and aminoethylaminoisobutyl.

21. A method of forming a siloxane coating on a glass container including the steps of:
   (a) applying a silane coating composition to an exterior surface of the glass container, wherein the silane coating composition does not include a non-ionic surfactant and constitutes 0.5-3.0 wt % of an aminofunctional silane and about 98 wt % water;
   (b) curing the silane coating composition to form the siloxane coating on the exterior surface of the glass container; and then
   (c) heating the glass container and the siloxane coating to a temperature in the range of 500 degrees Celsius to 700 degrees Celsius to decompose organofunctional groups attached to the siloxane coating.

22. The method set forth in claim 21, wherein the siloxane coating formed in step (b) has a thickness in the range of 100 nm to 300 nm.

23. The method set forth in claim 21 wherein the silane coating composition includes less than 5 wt. % colloidal silica.

24. A method of manufacturing a soda-lime-silica glass container, which includes the steps of:
   (a) forming the glass container;
   (b) forming a hot-end coating on an exterior surface of the glass container;
   (c) annealing the glass container;
   (d) forming a siloxane coating on the glass container over the hot-end coating and then
   (e) forming a cold-end coating on the glass container over the siloxane coating,
   wherein forming the siloxane coating in step (d) comprises the steps of:
      i) applying a silane coating composition to an exterior surface of the glass container, wherein the silane coating composition is an aqueous solution consisting essentially of an aminofunctional silane and water,
      ii) curing the silane coating composition to form the siloxane coating on the exterior surface of the glass container, and then
      iii) heating the glass container and the siloxane coating to a temperature in the range of 500 degrees Celsius to 700 degrees Celsius to decompose organofunctional groups attached to the siloxane coating.

* * * * *